Feb. 5, 1957
J. L. ALEXANDER
2,780,081
HOLDER FOR COFFEE MAKER TOP
Filed Jan. 21, 1953
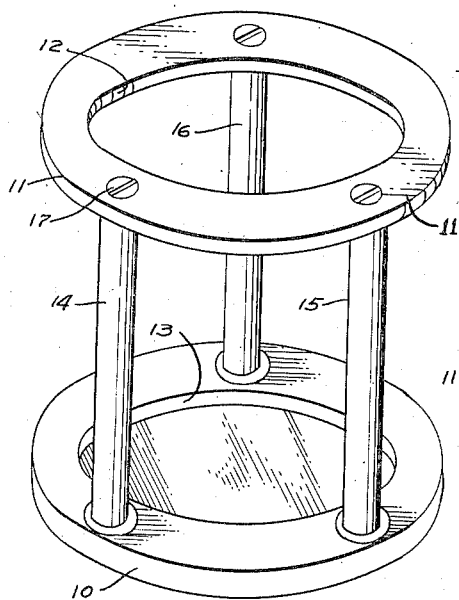
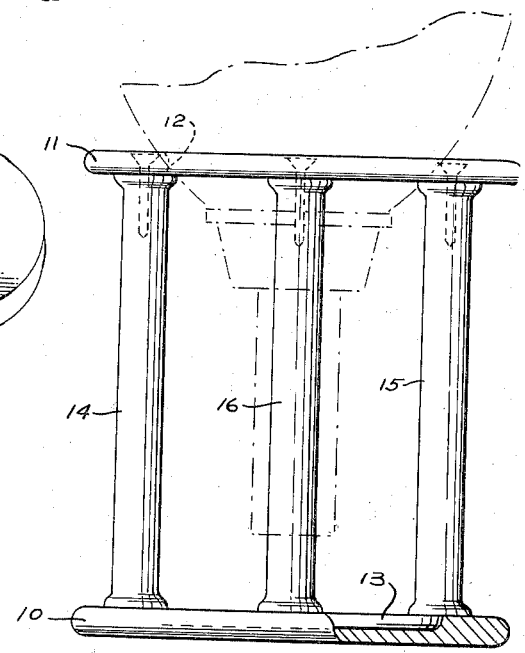
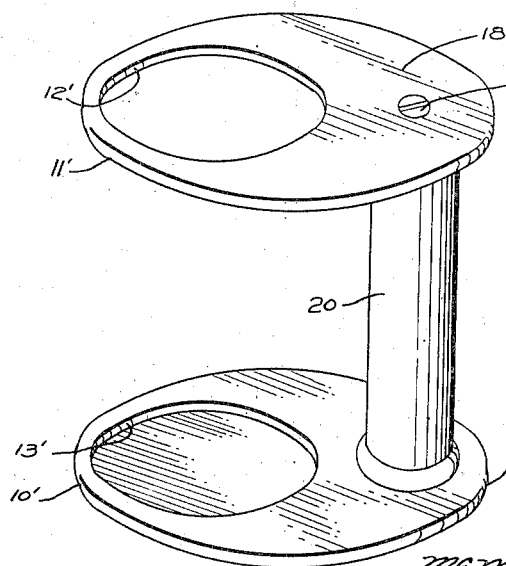
INVENTOR.
James L. Alexander
BY
McMorrow, Berman & Davidson
ATTORNEYS

United States Patent Office 2,780,081
Patented Feb. 5, 1957

2,780,081

HOLDER FOR COFFEE MAKER TOP

James L. Alexander, Joliet, Ill.

Application January 21, 1953, Serial No. 332,201

1 Claim. (Cl. 65—65)

This invention relates to holders for funnel shaped objects, such as coffee maker tops, and more particularly to a portable holder by means of which a coffee maker top can be supported in an upright position on a horizontal supporting surface and moved from place to place.

It is among the objects of the invention to provide an improved holder for a funnel shaped object, such as a coffee maker top, which can be placed on a substantially horizontal supporting surface, such as a table, counter or sink top or a shelf, and will support the object in substantially upright position on the supporting surface; which is freely portable and can be used to move an object supported thereby from place to place; which provides a basin for catching the drip from an object, such as a coffee maker top; and which is simple and durable in construction, economical to manufacture, and neat and attractive in appearance.

Other objects and advantages will become apparent from a consideration of the following description and the appended claim in conjunction with the accompanying drawing wherein:

Figure 1 is a perspective view of a holder illustrative of the invention;

Figure 2 is a side elevational view of a slightly modified form of holder; and

Figure 3 is a perspective view of a still further modified form of holder.

With continued reference to the drawing, the holder illustrated in Figures 1 and 2 comprises a lower plate 10, an upper plate 11 disposed above and parallel to the bottom plate 10, and strut means extending between and secured at the opposite ends thereof to said plates supporting said plates in spaced apart and substantially parallel relationship to each other.

In the arrangement illustrated in Figure 1, the lower and upper plates 10 and 11 are of circular shape and the upper plate is provided with a concentrically disposed opening 12 of circular shape occupying the major portion of the area of this plate and adapted to receive the lower portion of a funnel shaped, coffee maker top adjacent the top end of the stem portion of the top. The bottom plate 10 is provided with a circular recess 13 in the upper surface thereof, which recess is preferably of substantially the same size as the opening 12 in the upper plate 11, the recess 13 constituting a basin for receiving the drip from a coffee maker top supported in the opening 12 in the upper plate 11 of the holder.

The strut means of Figures 1 and 2 comprises three columns or struts 14, 15 and 16 extending between the top surface of the bottom plate 10 and the lower surface of the top plate 11 with their center lines perpendicular to the corresponding plate surfaces and disposed at substantially equal angular intervals around the circular recess 13 in the bottom plate and the circular opening 12 in the top plate. These struts are secured to the plates by suitable means, such as screws, as indicated at 17, extending through apertures in the plates and threaded into tapped holes provided in the corresponding ends of the strut.

When the coffee maker top is supported on the top plate 11 of the holder, with its stem extending through the opening 12 in the top plate toward the bottom plate 10, and terminating above the upper surface of the bottom plate, the top will be securely supported in upright position on the horizontal supporting surface on which the holder is disposed and the stem of the coffee maker top will be protected by the plates and the strut against contact with objects which might tend to break the stem. At the same time, any drip from the coffee maker top will fall into the basin provided by the recess or depression 13 in the top surface of the bottom plate 10, so that this drip of coffee will not be spilled on an associated supporting surface.

The slightly modified form of the device shown in Figure 2 is substantially the same as that shown in Figure 1, except the device shown in Figure 2 is designed to be formed of a readily moldable material, such as a synthetic resin plastic. The same numerals have been given to the several parts in Figure 2 as in Figure 1, the main differences being that the outer edges of the plates 10 and 11 are rounded, the struts 14, 15 and 16 have rounded annular flanges or capitals at their opposite ends and the edge of the recess 13 is also rounded upwardly and outwardly. This modified form provides a device of somewhat more pleasing appearance than the device shown in Figure 1, but is structurally the same.

In the modified arrangement shown in Figure 3, the bottom and top plates 10' and 11' are of circular shape and of substantially the same size as the plates 10 and 11 shown in Figures 1 and 2. In the arrangement of Figure 3, however, the opening 12' in the top plate 11' is disposed eccentrically of the circular plate, leaving a plate portion 18 somewhat wider than the remainder of the plate between one part of the opening 12' and the adjacent portion of the periphery of the plate.

The recess 13' in the bottom plate 10' is also eccentrically disposed relative to the bottom plate in the same manner as the opening 12' is eccentrically disposed in the top plate 11', leaving a wider portion 19 of the bottom plate between one part of the recess 13' and the adjacent part of the periphery of the bottom plate. In this case, a single strut 20, somewhat larger in diameter than the struts shown in Figures 1 and 2, extends from the wider portion 19 of the bottom plate 10' to the wider portion 18 of the top plate 11' between the upper surface of the bottom plate and the lower surface of the top plate and is disposed perpendicular to the planes of the parallel plates 10' and 11'. The plates are rigidly secured to the strut 20 by suitable means, such as the screw 21, extending through apertures in the plates and threaded into tapped holes in the corresponding ends of the strut.

The modified holder shown in Figure 3 provides a holder which is somewhat more convenient to grasp and move while the coffee maker top is supported therein, but is otherwise functionally the same as the holders illustrated in Figures 1 and 2.

The invention may be embodied in other specific forms without departing from the spirit or essential characteristics thereof. The present embodiments are, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

In a holder for a coffee maker top, a round flat bottom plate having an upper surface having a depression defining a drip basin therein, a round flat top plate overlying said bottom plate and having an underside, said top plate having a coffee maker top receiving opening, said opening and said basin being eccentrically positioned toward one side of the plates and vertically aligned with each other, a single vertical strut having upper and lower ends engaged respectively with the underside of the top plate and the upper surface of the bottom plate, said strut being located inwardly of the edges of the plates, and in the space between the plates at the other side from the basin and opening, and means securing the strut to the top and bottom plates.

References Cited in the file of this patent

UNITED STATES PATENTS

| | | |
|---|---|---|
| D. 46,523 | Behrend | Oct. 13, 1914 |
| D. 72,794 | Farber | June 7, 1927 |
| D. 120,138 | Poplawski | Apr. 23, 1940 |
| D. 155,560 | Toland | Oct. 11, 1949 |
| 192,348 | Preston | June 26, 1877 |
| 523,068 | Gaul | July 17, 1894 |
| 536,573 | Knuschke | Mar. 26, 1895 |
| 918,355 | McGowan | Apr. 13, 1909 |
| 1,157,778 | Hemming et al. | Oct. 26, 1915 |
| 1,180,881 | Ricciardelli | Apr. 25, 1916 |
| 1,256,434 | Bozzella | Feb. 12, 1918 |
| 1,646,523 | Bernard | Oct. 25, 1927 |
| 1,672,033 | Mallins | June 5, 1928 |
| 2,187,974 | Johnson | Jan. 23, 1940 |
| 2,216,255 | Tate | Oct. 1, 1940 |
| 2,281,652 | Wolcott | May 5, 1942 |
| 2,536,492 | Dunn | Jan. 2, 1951 |

FOREIGN PATENTS

| | | |
|---|---|---|
| 362,283 | Great Britain | Dec. 3, 1931 |